June 21, 1949. J. JOHNSON 2,473,588
METHOD OF MOLDING LENSES AND
LIKE OPTICAL ELEMENTS
Filed Nov. 23, 1944
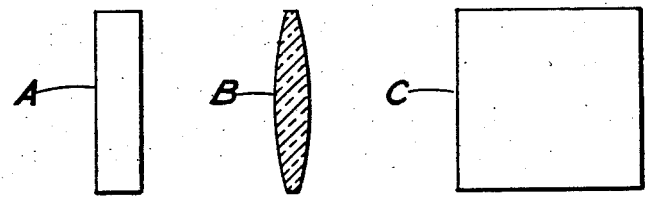
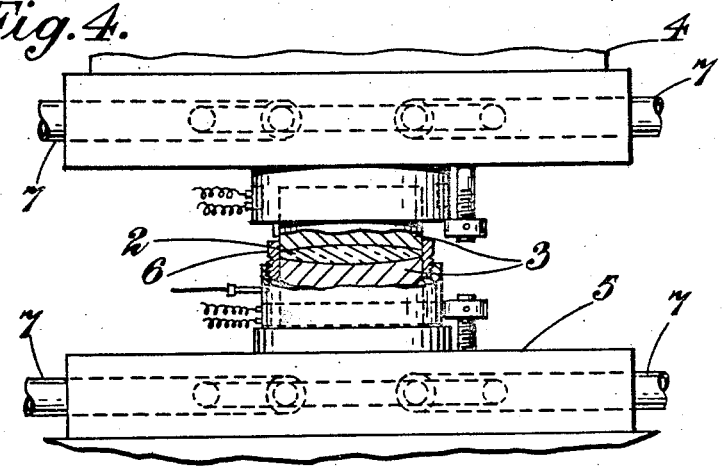
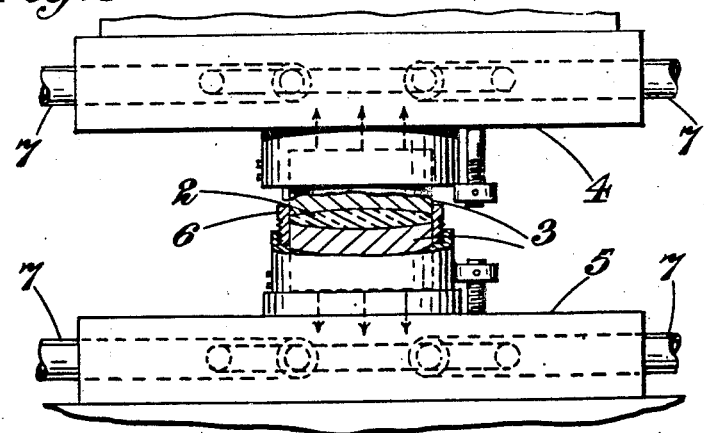
JOHN JOHNSON
INVENTOR
by his attorneys
Stebbins, Blenko & Webb Patented June 21, 1949

2,473,588

UNITED STATES PATENT OFFICE 2,473,588

METHOD OF MOLDING LENSES AND LIKE OPTICAL ELEMENTS

John Johnson, Slough, England, assignor to Combined Optical Industries Limited, Slough, England, a British company Application November 23, 1944, Serial No. 564,794
In Great Britain September 6, 1943

Section 1, Public Law 690, August 8, 1946
Patent expires September 6, 1963

2 Claims. (Cl. 18—47.5)

This invention relates to an improved method of moulding lenses and like optical elements in which a high degree of accuracy is required from plastics, particularly from clear transparent thermoplastic materials such as methyl methacrylate polymer or polystyrene. The objects of the invention comprise the provision of improvements and refinements in the production of such articles, so as to ensure a high degree of optical precision and freedom from stresses, etc., in the finished product; they also and more particularly comprise the provision of methods whereby errors in moulding, due to distortion of the material on account of non-uniform solidification thereof during cooling, may be obviated. Such errors are overcome by a technique which involves heating the plastic blank, preparatory to moulding, in such a way that only a very thin outer layer thereof is softened, the interior portions of the blank remaining solid during the moulding.

The invention may advantageously be applied to the moulding of various elements which have varying thicknesses, and in which a high degree of precision is required, but it will be particularly described in connection only with the moulding of lenses. Lenses having optically accurate surfaces may be produced from plastics by moulding the same between highly polished die surfaces, at a temperature which is high enough to render the material sufficiently plastic to be moulded, but is not high enough to injure the polished surfaces of the dies, as has previously been described. The use in such processes of a blank or workpiece which has been preformed to a shape closely approximating to the shape of the final moulded article has also been described. Such a blank is preferably preformed by cutting, grinding, or like mechanical operations, and is then moulded between optically-accurate dies, the result of this being that much less plastic material is required to flow under the moulding pressure than would be the case if the press had to do all the work of altering the shape of a flat disc to that, for example, of a lens. As is well known, when resinous thermoplastic materials are moulded from flat sheets into the shape of lenses stresses are ordinarily set up which tend to make the same return to their previous shape. The result of removing material from the blank by cutting or the like mechanical operations (in contradistinction to moulding a preform) is to produce a preform which is free from such stresses, and the subsequent moulding of the same results in the production of a lens which is much more free from internal stresses than would be the case if the blank were not preformed as described.

It has been found, however, that even with the use of a blank preformed in this way certain possibilities of errors in moulding may arise. These may arise from any of the following causes: (a) the dies (generally of hardened steel) will be of different shape at the temperature at which the plastic solidifies from that which they attain at the temperature at which they were made. (b) The plastic will have a different size and shape at the temperature at which it solidifies from those it attains at the temperature at which it is used. (c) Distortion of the plastic may take place if the solidification of the plastic does not take place uniformly and simultaneously throughout its bulk.

I have found that, in certain cases, the possibility of error referred to under (c) may have a definite and noticeable effect on the optical properties of the lens, especially where one part of the lens is much thicker than another, and the present invention is largely directed to the overcoming of this difficulty. As to the errors referred to above under (a), it need merely be said that errors due to change of shape of the dies can be allowed for if steps are taken to ensure that the dies are always heated and cooled in the same manner, preferably from their back surfaces, and also to ensure that during heating and cooling the back surface is isothermal or practically so. And, in the same way, the possibility of error under (b) can be dealt with readily if the same technique of heating and cooling is used consistently.

Considering now distortion of the plastic due to non-uniform solidification thereof during cooling, it has been found that when a convex lens is moulded, for example a thick bi-convex lens, and the lens and dies enclosing the same are cooled by abstracting heat isothermally through the flat back surfaces of the dies, the peripheral portion of the lens, being thinner than the central portion, will tend to solidify earlier than the central portion. Thereafter, during the solidification of the central portion, tendency of the plastic material to flow under pressure is impeded by the surrounding solidified ring, and distortion may occur. Similarly, when a thick concave lens is moulded, the central, thinner, portion of the lens will solidify before the periphery; during cooling, and distortion may occur. Generally speaking, any variations in thickness of the material of the blank softened to moulding temperature tend to prevent uniform and simultaneous solidification thereof during cooling; the problem does not arise in the moulding of a flat disc with parallel sides, provided that the die surfaces are isothermal and the original sheet of material of uniform thickness.

Another factor tending to cause unequal solidification of the blank is the varying thickness of different portions of the metal dies, in which, when the back surfaces are cooled isothermally, the front surfaces do not reach the solidifying temperature of the plastic at the same time. This factor may tend to counteract the unequal solidification of the blank due to varying thicknesses of the latter, since the die is relatively thick where the blank is relatively thin, and vice versa. This factor is, however, of very slight importance because of the good heat conductivity of the metal dies as compared with the plastic material, and may accordingly be ignored.

I have found that the unequal solidification difficulty may be overcome by preheating the preformed blank in such a way that only the outer layer or skin thereof is softened sufficiently to flow under moulding pressure. If the blank is subjected for a short period to a temperature which is somewhat above the softening temperature of the material of the blank, this temperature being uniformly applied over the whole surface of the blank, or approximately so, the result will be to soften only the outer layer to a slight depth which is substantially uniform over the whole surface which is to be moulded, regardless of the varying thickness of the interior portion of the blank which remains solid. It is therefore evident that the material which undergoes actual moulding is equivalent to a thin flat sheet, and the problem of unequal solidification, due to different depths and masses of cooling plastic material, is removed. Further, since the preformed blank is cut down almost to the final curvature of the moulded lens, there is so little material to be moved in the moulding operation that softening the blank to a slight depth only will permit such moulding to be effected. The preforming of the blank almost to its final curvature thereby prevents distortion (or aids in the prevention of distortion) in at least two ways, by greatly reducing the amount of material which has to be moved during the moulding, and by making a softening of only the outer layer of the blank sufficient to enable the moulding to take place.

In order that the invention may be more clearly understood, a specific example of the same will now be given, in connection with the accompanying drawing, in which the steps of the process are indicated diagrammatically.

In the drawings:

Figure 1 shows a lens blank prior to processing;

Figure 2 shows a lens blank after being machined to approximately the desired form;

Figure 3 is a diagrammatic drawing of an oven;

Figure 4 is a diagrammatic drawing partly in cross-section of a press for moulding the machined lens blanks; and Figure 5 is a similar drawing to Figure 4 indicating the manner in which cooling of the lens and dies is effected.

The blank B is first produced by trepanning from a circular sheet or circular disc, which may be about 3% less in diameter than the finished lens, as shown in the drawing at A (Figure 1). This blank is then machined in a lathe with formed cutters, so that the radius of each convex surface is 3% shorter than that in the finished lens, and so that the radius of each concave surface is 3% longer than in the finished lens. The preformed blank thus formed is indicated at B in Figure 2 of the drawings.

The machined surfaces of the preform are then smoothed with fine emery paper while the blank is in the lathe, and it is then buffed to remove tool marks and to give a smooth finish so that dust thereon will be visible, to permit easy cleaning before the moulding operation. The blanks are cleaned and stored at a uniform temperature near the temperature at which the finished lenses are to be used. For example, they may be stored in a thermostat cabinet at 25° C. long enough to ensure that they are uniformly at that temperature.

The blanks, before moulding, are subjected for quite a short time to externally applied heat. For example, the formed blank B is placed in a thermostatically-controlled electric preheating oven for quite a short time, say three minutes. Such an oven is indicated diagrammatically at C in Figure 3 of the drawings.

The temperature to which the blank is subjected must be determined so as to provide the required softening to the slight depth required for the moulding operation. For blanks for spectacle lenses made of methyl methacrylate polymer a suitable temperature in the oven is 250° C. and for such blanks made of polystyrene it is 200° C. It will be observed that such temperatures are considerably above the moulding temperatures for the materials named, these being about 130° C. for methyl methacrylate polymer and about 120° C. for polystyrene. The blank, however, during its short period of heating, will not attain to anything like as high a temperature as the oven, but will only reach a temperature in the neighbourhood of 150° C. for methyl methacrylate, which allows for a certain amount of cooling off while the blank is being transferred from the oven to the dies, to permit the temperature of the blank to be at or somewhat above the moulding temperature of the material at the time moulding takes place. It should be remarked that the steel of the dies oxidizes at about 200° C. and the decomposition temperatures of methyl methacrylate polymer is about 160° C. so that, of course, such high temperatures in the mould must never be reached. The effect of this short heating, say for about 3 minutes, at these relatively high temperatures is to soften the outer layer or skin of the blank, leaving the interior solid. It is found that in the conditions above described the depth of the outer layer of plastic which is heated to a temperature above the softening point is about 1.5 mm., this referring to each of the upper and lower surfaces of the blank. Therefore, independently of the shape of the lens, the material which undergoes actual moulding, on each side is equivalent to a flat sheet of a practically uniform thickness of 1.5 mm., thus removing one of the chief causes of distortion, as above explained.

The dies are heated at the same time to the moulding temperature, say 130° C. for methyl methacrylate polymer and 120° C. for polystyrene. The heating of the dies should be synchronized with the preheating of the preformed blanks, so that the dies are at the correct moulding temperature when each blank is removed from the preheating oven. Each blank, when its preheating is finished, is transferred to the heated dies, the press is closed, and the pressure applied to effect the moulding. This is indicated in Figures 4 and 5 of the drawings where the formed blank 2 is positioned between dies 3, 3, in a press which may have a movable upper member 4, to which the upper die is secured, and a stationary support 5, upon which the lower die rests. The press and mould are, of course, only indicated diagrammatically, the mould being considered to be of the closed type, with a surround indicated at 6, secured to the fixed support 5, and closely surrounding both lower and upper dies (the upper die being slidably mounted therein) and the enclosed blank 2.

The result of the application of the moulding pressure is the shaping of the blank into the final desired dimensions of the finished lens. Cooling of the dies and moulded lens is caused to take place, through the backs of the dies 3, 3, isothermally, in well-known manner, this step being indicated diagrammatically by the arrows in Figure 5 of the drawings. As a merely conventional showing, pipes 7 are indicated as extending through the members 4, 5 by which the dies are carried, for the circulation of steam for heating, and of cold water for cooling, the dies. It is desirable that pressure be maintained on the blank during cooling, until the moulded blank has sufficiently set for it to be removed. It is desirable that the cooling should be at a rather slow rate, preferably not more rapidly than at the rate of 15° C. per minute. The temperature at which the finished lens has sufficiently set for removal can readily be determined for different products and materials, but, generally, I have found a temperature of about 50° C. to be suitable.

In the operations described, regularity and consistency of technique are important; thus the transference of the blanks from the oven to the press must be done as quickly as possible, and the actual time taken for the transfer and for the closing of the press should be kept the same for successive operations.

In an alternative method, the short application of external heat to the surfaces of the plastic blank may be effected through the dies themselves, that is, the blank may be placed, cold, upon the lower die, the upper die may be brought down into light contact with the blank, and heat applied uniformly to the dies to bring them and the contacting surfaces of the enclosed blank, quickly, up to a temperature a little higher than the softening temperature of the material. Thus, for methyl methacrylate polymer, the temperature of the dies and of the surfaces of the blank may be brought up to about 135° C. in the production of spectacle lenses, and up to about 125° C. for polystyrene. The temperature of the blank does not have to be so high in this case as when it is heated in an oven and transferred therefrom to the press, because moulding pressure can be applied immediately after the blank has been sufficiently softened, without the loss of heat experienced when the blank is transferred through the air from the oven to the press. In this case also the softening only of the outer layer of the blank can be effected to the same extent as has been already described. It will be observed that when preheating is effected in the electric oven the heat is applied uniformly over the whole surface of the blank, and that when it is effected when the blank is already in position between the dies the heat is applied almost uniformly over the whole surface of the blank which is to be moulded, provided that the dies are heated isothermally through their flat back surfaces.

It should also be observed that the depth of softening of the blank may be, and preferably is, related to the amount of material which is left, by the preforming, to be caused to flow into final shape in the moulding operation, so that the depth of the softened outer layer need only be enough to permit this to take place.

I claim:

1. The method of moulding optical elements of varying thickness from transparent organic thermoplastic materials, which comprises removing material from a blank of such material by mechanical operations to preform it to a shape closely approximating that which the finished element is to have, subjecting the same for a short period to the application of heat approximately uniformly over the whole surface thereof at a temperature in excess of the temperature at which such material softens and will flow under pressure, so as to soften the outer layer only of the blank to a substantially uniform thickness, while leaving the remainder of the blank below such softening temperature, such remainder being of a non-uniform thickness which in parts is considerably greater than the thickness of said surface layer, moulding the blank between optically-accurate dies and abstracting heat from the moulded element, approximately uniformly over the whole moulded surface thereof, to cool the same under pressure, to cause the same to set.

2. The method of moulding optical lenses of varying thickness from transparent organic thermoplastic materials, which comprises removing material from a blank of such material by mechanical operations to preform it to a shape closely approximating that which the finished lens is to have, so that the radius of curvature of each concave surface is of the order of three per cent longer and the radius of curvature of each convex surface is of the order of three per cent shorter than they are to be in the finished lens, applying heat approximately uniformly over the whole surface thereof to be moulded for a short period of time to produce softening of the surface layer to a relatively slight uniform depth of the order of about 1.5 mm. while leaving the remainder of the blank solid, such remainder being of a non-uniform thickness which in parts in considerably greater than the thickness of said surface layer, moulding the blank between heated optically-accurate dies, to cause the softened material of the said surface layer only to flow radially, thereby to cause the surfaces of the blank to conform to the surfaces of the dies, and abstracting heat from the moulded element approximately uniformly over the whole moulded surface thereof, to cause the same to set.

JOHN JOHNSON.

REFERENCES CITED

The following references are of record in the file of this patent:

UNITED STATES PATENTS

| Number | Name | Date |
| --- | --- | --- |
| 2,166,215 | Lloyd | July 18, 1939 |
| 2,314,838 | Kingston | Mar. 23, 1943 |
| 2,339,433 | Staeble | Jan. 18, 1944 |
| 2,342,378 | Smith | Feb. 22, 1944 |
| 2,428,697 | Champer | Oct. 7, 1947 |